US012712354B2

(12) United States Patent
Chiu

(10) Patent No.: US 12,712,354 B2
(45) Date of Patent: Aug. 18, 2026

(54) MULTI-CHANNEL CIRCUIT

(71) Applicant: NOVATEK Microelectronics Corp., Hsin-Chu (TW)

(72) Inventor: Hsiang-Yi Chiu, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 757 days.

(21) Appl. No.: 17/858,032

(22) Filed: Jul. 5, 2022

(65) Prior Publication Data

US 2024/0014644 A1 Jan. 11, 2024

(51) Int. Cl.
*H02H 3/00* (2006.01)
*H02H 1/00* (2006.01)
*H02H 3/08* (2006.01)

(52) U.S. Cl.
CPC ............ *H02H 3/08* (2013.01); *H02H 1/0007* (2013.01)

(58) Field of Classification Search
CPC ............................... H02H 3/08; H02H 1/0007
USPC ........................................................... 361/87
See application file for complete search history.

(56) References Cited

U.S. PATENT DOCUMENTS 5,173,684 A * 12/1992 Ijiri ....................... G01M 3/045 200/61.04
6,861,827 B1 * 3/2005 Yang ....................... G05F 1/575 323/280
7,079,368 B2 * 7/2006 Ishikawa ............ H03K 17/0822 361/93.1
2009/0154261 A1 * 6/2009 Achter .................. G11C 7/106 365/189.15
2011/0216448 A1 * 9/2011 Hisada ..................... H02H 9/02 361/18
2019/0052073 A1 * 2/2019 Stanculescu ........... G01K 3/005
2021/0273634 A1 * 9/2021 Djelassi-Tscheck ... H02H 5/041

* cited by examiner

*Primary Examiner* — Crystal L Hammond
*Assistant Examiner* — Lucy M Thomas
(74) *Attorney, Agent, or Firm* — Winston Hsu

(57) ABSTRACT

A multi-channel circuit is provided. The multi-channel circuit includes a plurality of channel circuits and an overcurrent protection circuit. The channel circuits are configured to output sensing signals associated with channel output signals. Each channel circuit includes a channel output circuit for outputting a channel output signal and one of the sensing signals is associated with the channel output signal of the channel output circuit. The overcurrent protection circuit includes a selection circuit, a current sensing circuit and a comparator. The selection circuit is configured to receive sensing signals associated with channel output signals and select a target sensing signal from the sensing signals. The current sensing circuit is configured into convert the target sensing signal into a target sensing voltage. The comparator is configured to compare the target sensing voltage with a reference voltage to generate a comparison result indicating an overcurrent situation of the channel circuits.

8 Claims, 6 Drawing Sheets

MULTI-CHANNEL CIRCUIT

BACKGROUND OF THE INVENTION

1. Field of the Invention

The present invention relates to a multi-channel circuit, and more particularly, to a multi-channel circuit capable of reducing layout area and channel-to-channel mismatch.

2. Description of the Prior Art

Overcurrent protection (OCP) is an important issue for all electronic products. Overcurrent protection circuits may be used to detect abnormal output current and prevent damage to circuits or electronic components of electronic devices. Please refer to FIG. 1. FIG. 1 is a schematic diagram of a conventional multi-channel circuit 1 with overcurrent protection. The multi-channel circuit 1 includes channel circuits 10_1 to 10_*n*, overcurrent protection circuits 12_1 to 12_*n* and a logic control circuit 14. As shown in FIG. 1, the multi-channel circuit 1 includes channel [1] to channel [n], and each channel includes a channel circuit and an overcurrent protection circuit. The overcurrent protection circuits 12_1 to 12_*n* obtain sensing signals VS[1] to VS[n] from the channel circuits 10_1 to 10_*n* and generate comparison results OCP[1] to OCP[n] according to the sensing signal VS[1] to VS[n]. For each channel, each channel circuit has a corresponding overcurrent protection circuit. Each overcurrent protection circuit is coupled to a respective channel circuit for receiving a sensing signal and accordingly generating the corresponding comparison result. Further, the logic control circuit 14 receives the comparison results OCP[1] to OCP[n] from the overcurrent protection circuits 12_1 to 12_*n* and determines whether or not there is an overcurrent event occurs among the channel output signals according to the comparison results OCP[1] to OCP[n].

Moreover, each overcurrent protection circuit has a corresponding current sensing circuit, a reference voltage generator and a comparator. For example, the overcurrent protection circuit 12_1 includes a current sensing circuit CS[1], a reference voltage generator RV[1] and a comparator COM[1]. Each of the overcurrent protection circuit 12_2 to 12_*n* has the same circuit structure as the overcurrent protection circuit 12_1. The overcurrent protection circuit 12_2 includes a current sensing circuit CS[2], a reference voltage generator RV[2] and a comparator COM[2]. Such like this, the overcurrent protection circuit 12_*n* includes a current sensing circuit CS[n], a current source generator CG[n] and a comparator COM[n].

However, as each channel has its own respective overcurrent protection circuit including the components of current sensing circuit, the reference voltage generator and the comparator, the conventional multi-channel circuit 1 may require n current sensing circuits, n reference voltage generators and n comparators for the channel circuits of n channel configuration. As such, the n-channel overcurrent protection circuits would occupy a large amount of layout area in the multi-channel circuit 1 and also require more trimming or calibration time, thus resulting in high power consumption and production cost. Besides, the problem of channel-to-channel mismatch may not be avoided and solved effectively due to the multiple channel overcurrent protection circuit schemes. The channel-to-channel mismatch among the n-channel overcurrent protection circuits would significantly degrade and limit the system performance as a whole. Thus, there is a need for improvement.

SUMMARY OF THE INVENTION

It is therefore an objective of the present invention to provide a multi-channel circuit capable of reducing layout area and channel-to-channel mismatch, to solve the above-mentioned problems.

An embodiment of the present invention discloses a multi-channel circuit, comprising: a plurality of channel circuits, configured to output a plurality of sensing signals associated with a plurality of channel output signals, wherein each channel circuit comprises a channel output circuit for outputting a channel output signal and one of the plurality of sensing signals is associated with the channel output signal of the channel output circuit of the each channel circuit; and an overcurrent protection circuit, comprising: a selection circuit, coupled to the plurality of channel circuits, and configured to receive the plurality of sensing signals associated with the plurality of channel output signals and select a target sensing signal from the plurality of sensing signals associated with the plurality of channel output signals; a current sensing circuit, coupled to the selection circuit and configured into convert the target sensing signal into a target sensing voltage; and a comparator, coupled to the current sensing circuit and configured to compare the target sensing voltage with a reference voltage to generate a comparison result indicating an overcurrent situation of the plurality of channel circuits.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms “include” and “comprise” are utilized in an open-ended fashion, and thus should be interpreted to mean “include, but not limited to . . . ”. Also, the term “couple” is intended to mean either an indirect or direct electrical connection. Accordingly, if one device is coupled to another device, that connection may be through a direct electrical connection, or through an indirect electrical connection via other devices and connections.

Figure 2:
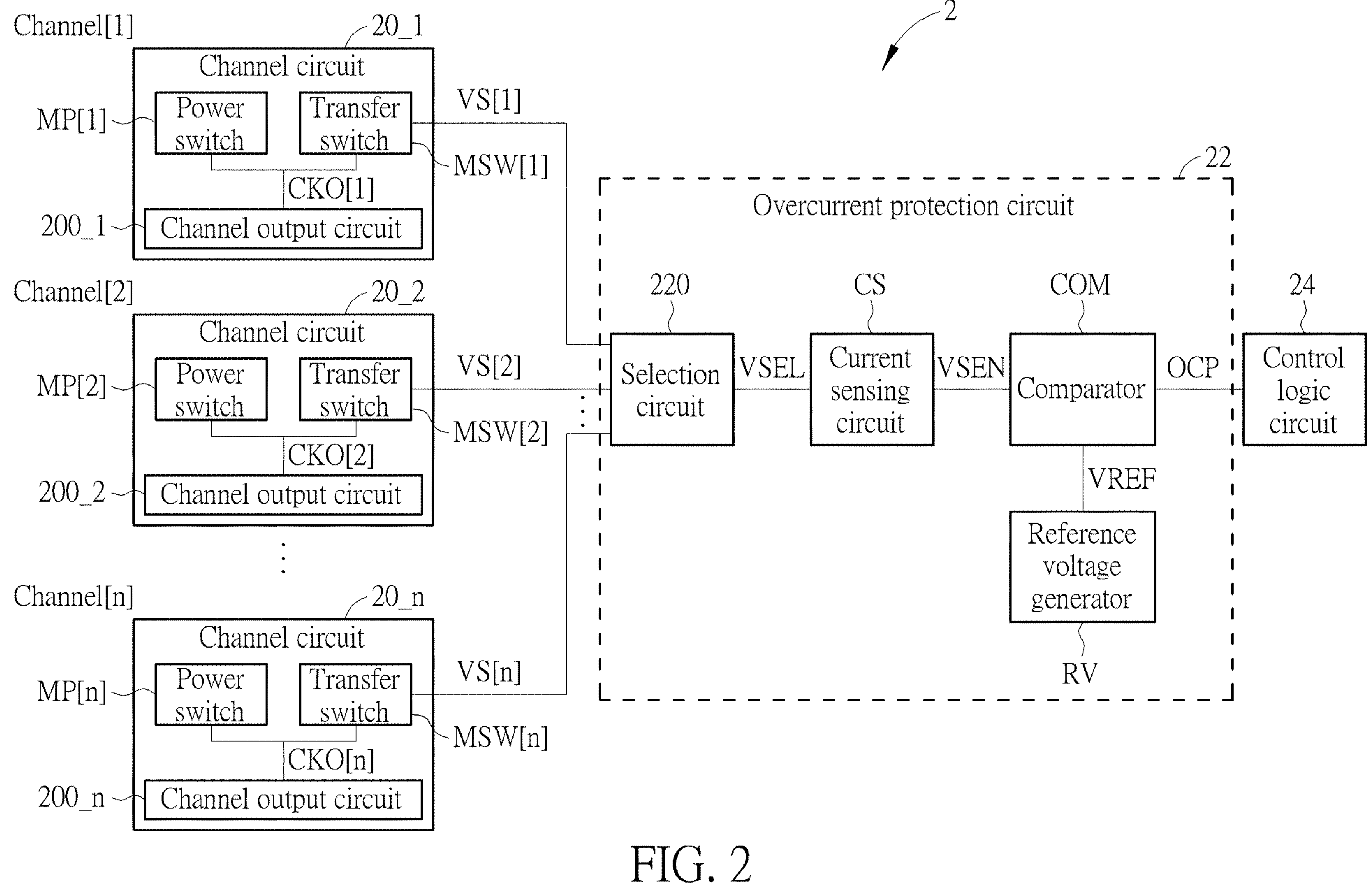
FIG. 2 is a schematic diagram of a multi-channel circuit according to an embodiment of the present invention.

Please refer to FIG. 2, which is a schematic diagram of a multi-channel circuit 2 according to an embodiment of the present invention. As shown in FIG. 2, the multi-channel circuit 2 includes channel circuits 20_1 to 20_*n*, an overcurrent protection circuit 22 and a control logic circuit 24. Each channel circuit is configured to output a sensing signal associated with a channel output signal of a corresponding channel output circuit. Each channel circuit may include a power switch, a transfer switch and a channel output circuit. Each channel output circuit outputs a channel output signal. The channel output circuit may be a level shifter circuit applied in a display device or any other function circuit. The transfer switch is coupled to the channel output circuit for receiving the channel output signal and outputting the sensing signal associated with the channel output signal of the channel output circuit in response to an enable signal. For example, as shown in FIG. 2, the channel circuit 20_1 includes a power switch MP[1], a transfer switch MSW[1] and a channel output circuit 200_1. The transfer switch MSW[1] of the channel circuit 20_1 is configured to output a sensing signal VS[1] associated with a channel output signal CKO[1] generated by the channel output circuit 200_1. The channel circuit 20_2 includes a power switch MP[2], a transfer switch MSW[2] and a channel output circuit 200_2, and the transfer switch MSW[2] of the channel circuit 20_2 is configured to output a sensing signal VS[2] associated with a channel output signal CKO[2] generated by the channel output circuit 200_2, and so on. The channel circuits 20_1 to 20_*n* may have the same circuit structure. Each sensing signal outputted by the channel circuit may reflect the signal status of the channel output signal of the corresponding channel output circuit. One aspect of the embodiments aims to detect overcurrent situations of the channel output signals CKO[1] to CKO[n] provided by the channel output circuits 200_1 to 200_*n* and prevents damage to the circuit or electronic product employing the channel output signals.

The overcurrent protection circuit 22 is coupled to the channel circuits 20_1 to 20_*n*. The overcurrent protection circuit 22 is configured to receive sensing signals VS [1] to VS [n] associated with the channel output signals CKO[1] to CKO[n] of the channel output circuits 200_1 to 200_*n* and generate a comparison result OCP according to the received sensing signals VS[1] to VS[n]. The overcurrent protection circuit 22 may select a target sensing signal VSEL from the sensing signals VS[1] to VS[n], convert the target sensing signal VSEL into a target sensing voltage VSEN, and compare the target sensing voltage VSEN with a reference voltage VREF so as to generate a comparison result OCP for indicating overcurrent situations of the channel circuits 20_1 to 20_*n*.

The overcurrent protection circuit 22 includes a selection circuit 220, a current sensing circuit CS, a reference voltage generator RV and a comparator COM. The channel circuits 20_1 to 20_*n* share a single common overcurrent protection circuit 22. The selection circuit 220 is coupled to the channel circuits 20_1 to 20_*n*, and configured to receive the sensing signals VS[1] to VS[n] associated with the channel output signals CKO[1] to CKO[n] of the channel output circuits 200_1 to 200_*n* and select a target sensing signal VSEL from the sensing signals VS[1] to VS[n]. The current sensing circuit CS is coupled to the selection circuit 220 and the comparator COM. The current sensing circuit CS is configured to convert the target sensing signal VSEL outputted from the selection circuit 220 into a target sensing voltage VSEN, and the target sensing voltage VSEN is provided to the comparator COM. The reference voltage generator RV is coupled to the comparator COM and configured to provide a reference voltage VREF to the comparator COM. The comparator COM is coupled to the current sensing circuit CS, the reference voltage generator RV and the control logic circuit 24, and configured to compare the target sensing voltage VSEN with the reference voltage VREF to generate a comparison result OCP indicating an overcurrent situation of the channel circuits 20_1 to 20_*n*.

The logic control circuit 24 is coupled to the comparator COM. The logic control circuit 24 is configured to receive the comparison result OCP, determine whether a current situation occurs according to the comparison result COM outputted from the overcurrent protection circuit 22 and accordingly generate an over overcurrent protection signal indicating whether or not an overcurrent event occurs among the channel output signals CKO[1] to CKO[n] of the channel output circuits 20_1 to 20_*n* so as to inform or activate related components of performing overcurrent protection process for preventing the circuits or electronic components of electronic device from being damaged by the excessive output current. For example, the related the circuits or electronic components employing the channel output signals CKO[1] to CKO[n] of the channel output circuits 20_1 to 20_*n* may be turned off, set to high impedance state or shut down, or the power supply may be cut off for performing a overcurrent protection process according to the over overcurrent protection signal of the logic control circuit 24 in order to prevent the circuits or electronic components from being damaged by the excessive output current.

Figure 3:
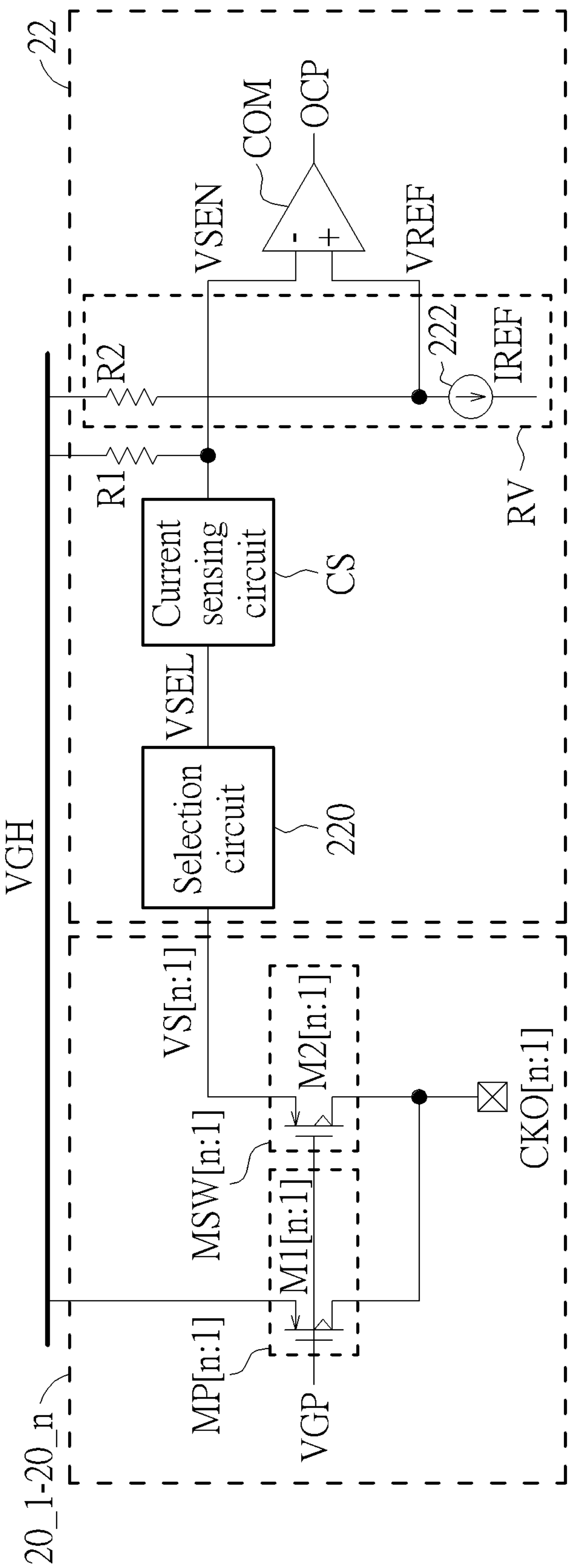
FIG. 3 is a schematic diagram of the channel circuits and the overcurrent protection circuit shown in FIG. 2 according to a first embodiment of the present invention.

In an embodiment, the power switches MP[1] to MP[n] may be pull-up circuits. The selection circuit 220 is configured to select a sensing signal having the minimum voltage value from the sensing signals VS[1] to VS[n] as the target sensing signal VSEL. The selection circuit 220 may select a sensing signal having the minimum voltage magnitude or amplitude level from the sensing signals VS[1] to VS[n] as the target sensing signal VSEL and output the target sensing signal VSEL to the current sensing circuit CS. Please refer FIG. 3, which is a schematic diagram of the channel circuits 20_1 to 20_*n* and the overcurrent protection circuit 22 shown in FIG. 2 according to a first embodiment of the present invention. As shown in FIG. 3, the power switch MP[1] includes a transistor M1[1]. The transistor M1[1] may be a metal oxide semiconductor (MOS) transistor or other device having similar functions. For example, the transistor M1[1] may be a p-type MOS (PMOS) transistor. The gate terminal of the transistor M1[1] receives an enable signal VGP. The drain terminal of the transistor M1[1] is coupled to the channel output circuit 200_1 for receiving the channel output signal CKO[1]. The source terminal of the transistor M1[1] is coupled to a first voltage VGH.

The transfer switch MSW [1] includes a transistor M2 [1]. The transistor M2[1] may be a MOS transistor or other device having similar functions. For example, the transistor M2[1] may be a PMOS transistor. The gate terminal of the transistor M2[1] receives the enable signal VGP. The drain terminal of the transistor M2[1] is coupled to the channel output circuit 200_1 for receiving the channel output signal CKO[1]. The source terminal of the transistor M2[1] is coupled to the selection circuit 220 for outputting a sensing signal VS[1] associated with the channel output signal CKO[1] of the channel output circuit 200_1 of the channel circuit 20_1 in response to the enable signal VGP. Any change in the channel output signal CKO[1] may be reflected on sensing signal VS [1]. The sensing voltage sensing signal VS[1] may be associated with a clock of the channel output signal CKO[1]. The sensing voltage sensing signal VS[1] may be proportional to the channel output signal CKO[1]. As can be seen, the greater the current of the channel output signal CKO[1] is, the lower the voltage of the sensing signal VS[1] is. In addition, the transfer switch MSW [1] may act as a switch and be capable of withstanding large changes in voltage. Moreover, each of the channel circuits 20_2 to **20_*n* may has the same circuit structure as the channel circuit 20_1. Therefore, for each channel circuit, the greater the current of the channel output signal is, the lower the voltage of the corresponding sensing signal is. As such, the selection circuit 220** may select a sensing signal having the minimum voltage value from the sensing signals VS[1] to VS[n] as the target sensing signal VSEL. The target sensing signal VSEL is converted to the target sensing voltage VSEN outputted to a first input terminal of the comparator COM.

As shown in FIG. 3, the reference voltage generator RV includes a current source 222 and a resistor R2. The current source 222 is coupled to the resistor R2 and the comparator COM for generating a reference current IREF. One terminal of the resistor R2 is coupled to a power supply terminal for receiving the first voltage VGH. The other terminal of the resistor R2 is coupled to the current source 222 and a second input terminal of comparator COM for outputting the reference voltage VREF. Since the reference current IREF flows through the resistor R2, the reference voltage VREF is outputted to the second input terminal of comparator COM. The reference voltage VREF may be associated with a difference between the first voltage VGH and the voltage drop of the resistor R2 caused by the reference current IREF. The comparator COM is configured to compare the target sensing voltage VSEN with the reference voltage VREF to generate a comparison result OCP indicating an overcurrent situation of the channel circuits 20_1 to **20_*n*. For example, when the reference voltage VREF is greater than the target sensing voltage VSEN, the comparator COM generates a comparison result OCP indicating that an overcurrent event occurs in the channel output signals CKO[1] to CKO[n] of the channel circuits 20_1 to 20_*n***.

Figure 4:
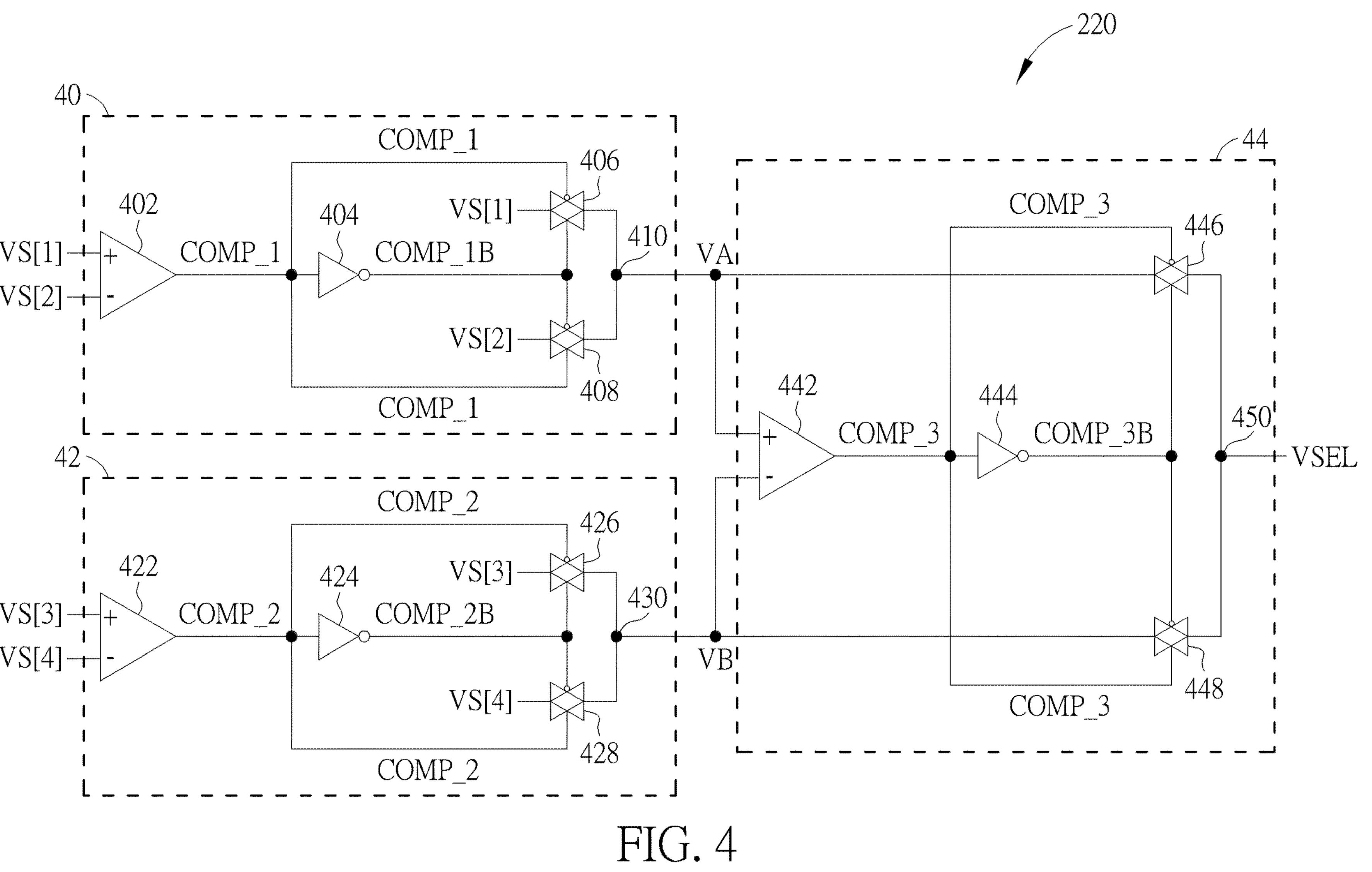
FIG. 4 is a schematic diagram of a selection circuit shown in FIG. 4 according to an embodiment of the present invention.

Taking the multi-channel circuit 2 with channel circuits 20_1 to 20_4 (four channels) for example, the channel circuits 20_1 to 20_4 output the sensing signals VS[1] to VS[4], respectively. The selection circuit 220 is configured to receive the sensing signals VS[1] to VS[4] and select a sensing signal having the minimum voltage from the sensing signals VS[1] to VS[4] for acting as the target sensing signal VSEL. Please refer to FIG. 4, which is a schematic diagram of a selection circuit 220 shown in FIG. 3 according to an embodiment of the present invention. As shown in FIG. 4, the selection circuit 220 includes first stage voltage selectors 40 and 42, a second stage voltage selector 44. Each of the first stage voltage selectors 40 and 42 is configured to compare each pair of the received sensing signals and accordingly generate a selected sensing signal. The second stage voltage selector 44 is configured to select the target sensing signal VSEL from the selected sensing signals outputted by the first stage voltage selectors 40 and 42. For example, the first stage voltage selector 40 compares the sensing signals VS [1] and VS [2] and selects one from the sensing signals VS[1] and VS[2] that has the lower voltage level for acting as a selected sensing signal VA of the first stage voltage selector 40. The first stage voltage selector 42 compares the sensing signals VS[3] and VS[4] and selects one from the sensing signals VS[3] and VS[4] that has the lower voltage level for acting as a selected sensing signal VB of the first stage voltage selector 42. After that, the second stage voltage selector 44 selects one from the selected sensing signals VA and VB that has the lower voltage level for acting as a target sensing signal VSEL.

As shown in FIG. 4, the first stage voltage selector 40 includes a comparator 402, an inverter 404 and transmission gates 406 and 408. The comparator 402 is configured to compare the sensing signal VS[1] with the sensing signal VS[2] to generate a comparison signal COMP_1. A first input terminal of the comparator 402 is coupled to the channel circuit 20_1 for receiving the sensing signal VS[1], and a second input terminal of the comparator 402 is coupled to the channel circuit 20_2 for receiving the sensing signal VS[2]. An output terminal of the comparator 402 is configured to output the comparison signal COMP_1. An input terminal of the inverter 404 is coupled to the output terminal of the comparator 402 for receiving the comparison signal COMP_1, and an output terminal of the inverter 404 is configured to output an inverted comparison signal COMP_1B. The inverted comparison signal COMP_1B is an inversion of the comparison signal COMP_1.

An input terminal of the transmission gate 406 is coupled to the channel circuit 20_1 for receiving the sensing signal VS[1], an inverting control terminal of the transmission gate 406 is coupled to the output terminal of the comparator 402 for receiving the comparison signal COMP_1, a non-inverting control terminal of the transmission gate 406 is coupled to the output terminal of the inverter 404 for receiving the inverted comparison signal COMP_1B, and an output terminal of the transmission gate 406 is configured to selectively output the sensing signal VS[1] according to the comparison signal COMP_1 and the inverted comparison signal COMP_1B. An input terminal of the transmission gate 408 is coupled to the channel circuit 20_2 for receiving the sensing signal VS[2], an inverting control terminal of the transmission gate 408 is coupled to the output terminal of the inverter 404 for receiving the inverted comparison signal COMP_1B, a non-inverting control terminal of the transmission gate 408 is coupled to the output terminal of the comparator 402 for receiving the comparison signal COMP_1, and an output terminal of the transmission gate 408 is configured to selectively output the sensing signal VS[2] according to the comparison signal COMP_1 and the inverted comparison signal COMP_1B. A selection output terminal 410 of the first stage voltage selector 40 is coupled to the output terminals of the transmission gates 406 and 408, and is configured to output either the sensing signal VS[1] or the sensing signal VS[2] as a selected sensing signal VA of the first stage voltage selector 40. As such, the first stage voltage selector 40 selects one from the sensing signals VS [1] and VS [2] that has the lower voltage level for acting as the selected sensing signal VA of the first stage voltage selector 40.

The first stage voltage selector 42 includes a comparator 422, an inverter 424 and transmission gates 426 and 428. The interconnections of the first stage voltage selector 42 are as shown in FIG. 4, and the first stage voltage selector 42 has similar operations and functions as the first stage voltage selectors 40. The comparator 422 is configured to compare the sensing signal VS [3] with the sensing signal VS[4] to generate a comparison signal COMP_2. The inverter 424 is configured to perform an inversion operation on the comparison signal COMP_2 and accordingly outputs an inverted comparison signal COMP_2B. The transmission gate 426 is configured to selectively output the sensing signal VS[3]

according to the comparison signal COMP_2 and the inverted comparison signal COMP_2B. The transmission gate 428 is configured to selectively output the sensing signal VS[4] according to the comparison signal COMP_2 and the inverted comparison signal COMP_2B. A selection output terminal 430 of the first stage voltage selector 42 is coupled to the output terminals of the transmission gates 426 and 428, and is configured to output either the sensing signal VS[3] or the sensing signal VS[4] as a selected sensing signal VB of the first stage voltage selector 42. The first stage voltage selector 42 selects one from the sensing signals VS[3] and VS[4] that has the lower voltage level for acting as the selected sensing signal VB of the first stage voltage selector 42.

Please further refer to FIG. 4. The second stage voltage selector 44 includes a comparator 442, an inverter 444 and transmission gates 446 and 448. The interconnections of the second stage voltage selector 44 are as shown in FIG. 4. The comparator 442 is configured to compare the selected sensing signal VA with the selected sensing signal VB to generate a comparison signal COMP_3. An output terminal of the comparator 442 is configured to output the comparison signal COMP_3. An input terminal of the inverter 444 is coupled to the output terminal of the comparator 442 for receiving the comparison signal COMP_3, and an output terminal of the inverter 444 is configured to output an inverted comparison signal COMP_3B. The inverted comparison signal COMP_3B is an inversion of the comparison signal COMP_3. An input terminal of the transmission gate 446 is coupled to the selection output terminal 410 of the first stage voltage selector 40 for receiving the selected sensing signal VA, an inverting control terminal of the transmission gate 446 is coupled to the output terminal of the comparator 442 for receiving the comparison signal COMP_3, a non-inverting control terminal of the transmission gate 446 is coupled to the output terminal of the inverter 444 for receiving the inverted comparison signal COMP_3B, and an output terminal of the transmission gate 446 is configured to selectively output the selected sensing signal VA according to the comparison signal COMP_3 and the inverted comparison signal COMP_3B. An input terminal of the transmission gate 448 is coupled to the selection output terminal 430 of the first stage voltage selector 42 for receiving the selected sensing signal VB, an inverting control terminal of the transmission gate 448 is coupled to the output terminal of the inverter 444 for receiving the inverted comparison signal COMP_3B, a non-inverting control terminal of the transmission gate 448 is coupled to the output terminal of the comparator 442 for receiving the comparison signal COMP_3, and an output terminal of the transmission gate 448 is configured to selectively output the selected sensing signal VB according to the comparison signal COMP_3 and the inverted comparison signal COMP_3B. A selection output terminal 450 of the second stage voltage selector 44 is coupled to the output terminals of transmission gates 446 and 448, and is configured to output either the selected sensing signal VA or the selected sensing signal VB as the target sensing signal VSEL. The second stage voltage selector 44 selects one from the selected sensing signals VA and VB that has the lower voltage level for acting as the target sensing signal VSEL of the selection circuit 220. As result, the selection circuit 220 select a sensing signal having the minimum voltage from the sensing signals VS[1] to VS[4] for acting as the target sensing signal VSEL while the selection circuit 220 is coupled to the channel circuits 20_1 to 20_4 including pull-up circuits.

In an embodiment, the relationship of the sensing signals VS[1] to VS[4] of the channel circuits 20_1 to 20_4 may be represented as follows: VS[1]>VS[2]>VS[3]>VS[4]. Please further refer to FIGS. 3 and 4. During operation, the selection circuit 220 receives the sensing signals VS[1] to VS[4] from the channel circuits 201 to 20_4. The comparison signals COMP_1 and COMP_2 are high, and the inverted comparison signals COMP_1B and COMP_2B are low. The sensing signal VS [2] is outputted to the selection output terminal 410 via the output terminal of the transmission gate 408 for acting as the selected sensing signal VA. The selected sensing signal VA outputted by the first stage voltage selector 40 is the sensing signal VS[2], i.e., (VA=VS [2]). Regarding the first stage voltage selector 42, the sensing signal VS[4] is outputted to the selection output terminal 430 via the output terminal of the transmission gate 428 for acting as the selected sensing signal VB. The selected sensing signal VB outputted by the first stage voltage selector 42 is the sensing signal VS[4], i.e., (VB=VS [4]). Further, the second stage voltage selector 44 receives the selected sensing signals VA and VB, i.e., VA=VS [2], VB=VS[4]. The comparison signal COMP_3 is high, and the inverted comparison signal COMP_3B is low. The selected sensing signal VB (i.e., sensing signal VS[4]) is outputted to the selection output terminal 450 via the output terminal of the transmission gate 448 for acting as the target sensing signal VSEL. The sensing signal VA[4] is selected as the sensing signal having the minimum voltage value among the sensing signals VS[1] to VS[4]. The target sensing signal VSEL outputted by the selection circuit 220 is the selected sensing signal VB, i.e., (VSEL=VB=VS[4]). Therefore, the target sensing signal VSEL is provided to the current sensing circuit CS for the following operations. The target sensing signal VSEL is converted to the target sensing voltage VSEN. The comparator COM compares the target sensing voltage VSEN with the reference voltage VREF to generate a comparison result OCP. For example, when the reference voltage VREF is greater than the target sensing voltage VSEN, the comparator COM generate a comparison result OCP indicating that an overcurrent event occurs in the channel output signals CKO[1] to CKO[4] of the channel circuits 20_1 to 20_4.

Figure 1:
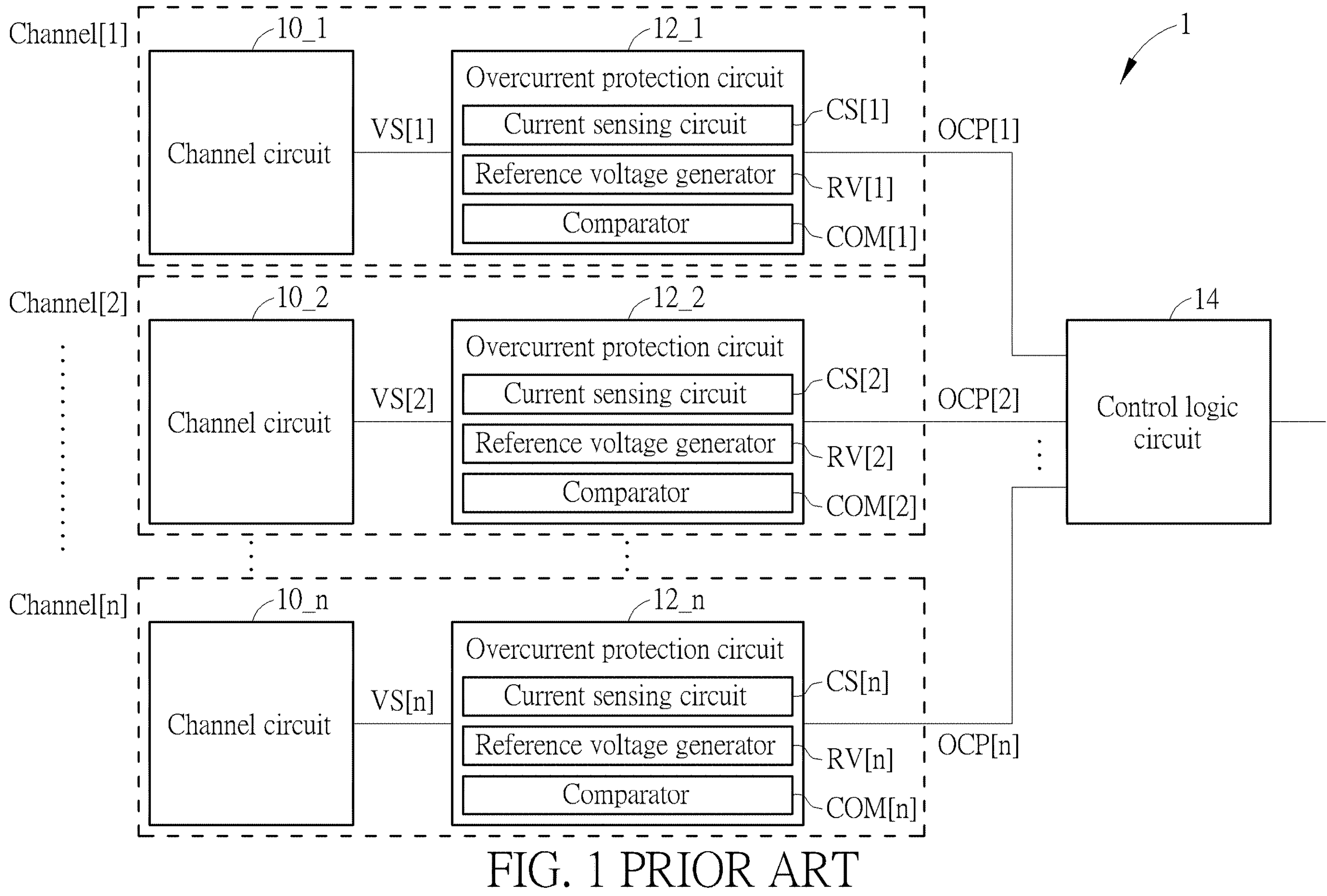
FIG. 1 is a schematic diagram of a conventional multi-channel circuit 1 with overcurrent protection.

In other words, since each channel circuit of the conventional multi-channel circuit 1 shown in FIG. 1 has a corresponding overcurrent protection circuit for overcurrent protection, the conventional multi-channel circuit 1 shown in FIG. 1 needs to use n overcurrent protection circuits (each including current sensing circuit, reference voltage generator and comparators) for n-channel channel circuits. The channel circuits 20_1 to 20_*n* of the embodiments of the present invention share a single common overcurrent protection circuit 22. Therefore, compared with the conventional multi-channel circuit, the multi-channel circuit 2 of the embodiments merely utilizes a single overcurrent protection circuit 22 including a selection circuit 220, a current sensing circuit CS, a reference voltage generator RV and a comparator COM so as to significantly reduce the number of the overcurrent protection circuit and, as a result, effectively reduce layout area and channel-to-channel mismatch.

In another embodiment, the power switches MP[1] to MP[n] may be pull-up circuits. The selection circuit 220 is configured to select a plurality of sensing signals with a first number of lowest voltage values from the sensing signals VS[1] to VS[n] as the target sensing signal VSEL. The selection circuit 220 may select sensing signals having the first number of lowest voltage magnitudes or amplitude levels from the sensing signals VS [1] to VS [n] as the target sensing signals VSEL and output the target sensing signals VSEL to the current sensing circuit CS. Therefore, the target sensing signals VSEL are provided to the current sensing circuit CS for the following operations. The target sensing signals VSEL are converted to target sensing voltages VSEN. The comparator COM compares each of the target sensing voltages VSEN with the reference voltage VREF to generate comparison results OCP. For example, when the reference voltage VREF is greater than at least one of the target sensing voltages VSEN, the comparator COM generate a comparison result OCP indicating that an overcurrent event occurs in the channel output signals CKO[1] to CKO[n] of the channel circuits 20_1 to 20_*n*. For example, the selection circuit 220 may select sensing signals having the bottom three lowest voltage values from the sensing signals VS[1] to VS[n] for acting as the target sensing signals VSEL. The selected target sensing signal VSEL having the bottom three lowest voltage values may be converted to target sensing voltages VSEN. When the reference voltage VREF is greater than at least one of the target sensing voltages VSEN, the comparator COM generate a comparison result OCP indicating that an occurrence of overcurrent event.

Figure 5:
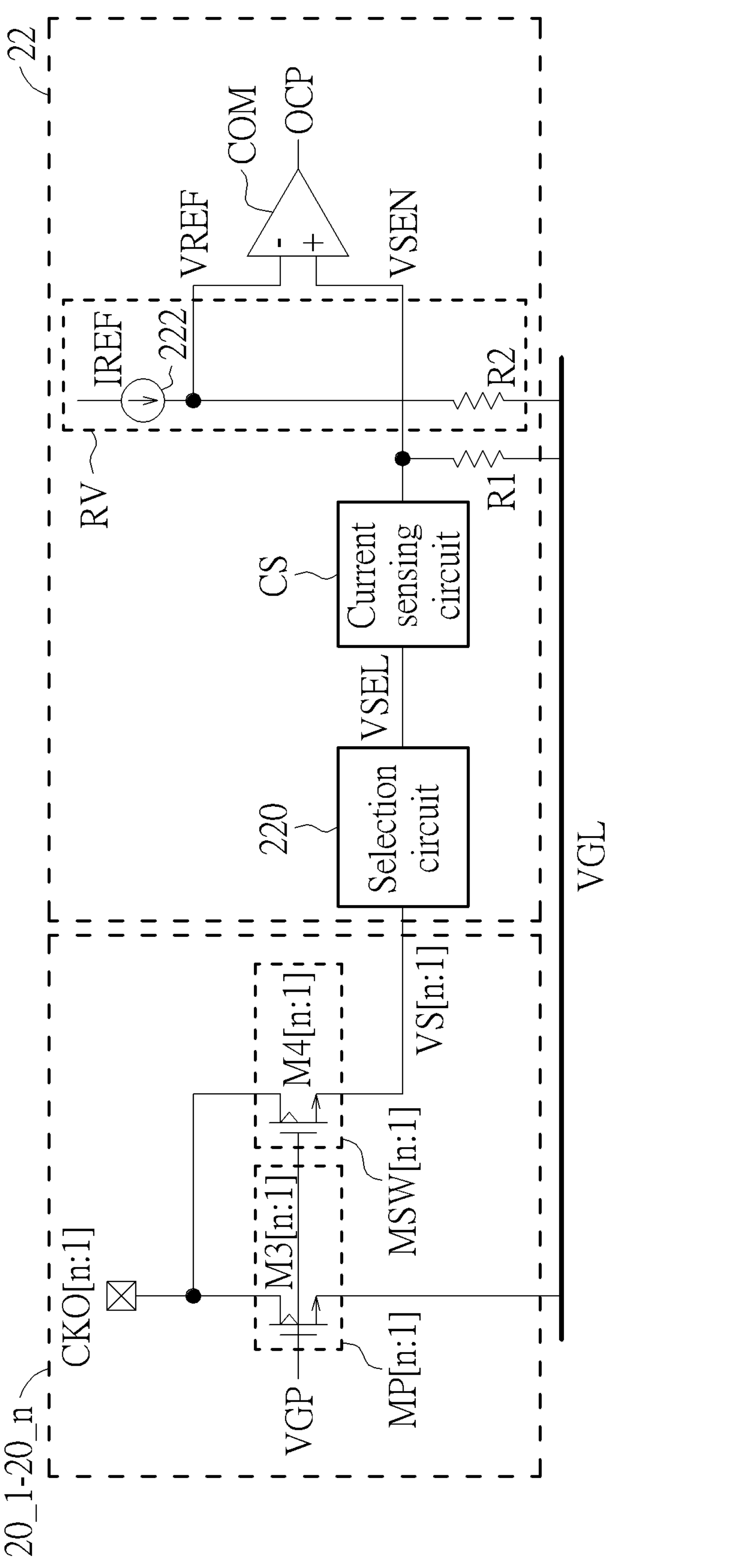
FIG. 5 is a schematic diagram of the channel circuits and the overcurrent protection circuit shown in FIG. 2 according to a second embodiment of the present invention.

In another embodiment, the power switches MP[1] to MP[n] may be pull-down circuits. The selection circuit 220 is configured to select a sensing signal having the maximum voltage value from the sensing signals VS[1] to VS[n] as the target sensing signal VSEL. The selection circuit 220 may select a sensing signal having the maximum voltage magnitude or amplitude level from the sensing signals VS [1] to VS [n] as the target sensing signal VSEL and output the target sensing signal VSEL to the current sensing circuit CS. Please refer FIG. 5, which is a schematic diagram of the channel circuits 20_1 to 20_*n* and the overcurrent protection circuit 22 shown in FIG. 2 according to a second embodiment of the present invention. As shown in FIG. 5, the power switch MP[1] includes a transistor M3[1]. The transistor M3 [1] may be a metal oxide semiconductor (MOS) transistor or other device having similar functions. For example, the transistor M3[1] may be an n-type MOS (NMOS) transistor. The gate terminal of the transistor M3[1] receives an enable signal VGP. The drain terminal of the transistor M3[1] is coupled to the channel output circuit 200_1 for receiving the channel output signal CKO[1]. The source terminal of the transistor M3 [1] is coupled to a second voltage VGL.

The transfer switch MSW [1] includes a transistor M4 [1]. The transistor M4[1] may be a MOS transistor or other device having similar functions. For example, the transistor M4 [1] may be an NMOS transistor. The gate terminal of the transistor M4[1] receives the enable signal VGP. The drain terminal of the transistor M4[1] is coupled to the channel output circuit 200_1 for receiving the channel output signal CKO[1]. The source terminal of the transistor M4[1] is coupled to the selection circuit 220 for outputting a sensing signal VS [1] associated with the channel output signal CKO[1] of the channel output circuit 200_1 of the channel circuit 20_1 in response to the enable signal VGP. The transfer switch MSW [1] may act as a switch and be capable of withstanding large changes in voltage. Any change in the channel output signal CKO[1] may be reflected on sensing signal VS[1]. The sensing voltage sensing signal VS[1] may be associated with a clock of the channel output signal CKO[1]. The sensing voltage sensing signal VS[1] may be proportional to the channel output signal CKO[1]. As can be seen, the greater the current of the channel output signal CKO[1] is, the higher the voltage of the sensing signal VS[1] is. Moreover, each of the channel circuits 20_2 to 20_*n* may has the same circuit structure as the channel circuit 20_1. Therefore, for each channel circuit, the greater the current of the channel output signal is, the higher the voltage of the corresponding sensing signal is. As such, the selection circuit 220 may select a sensing signal having the maximum voltage value from the sensing signals VS [1] to VS [n] as the target sensing signal VSEL.

As shown in FIG. 5, the target sensing signal VSEL is converted to the target sensing voltage VSEN outputted to a first input terminal of the comparator COM. The reference voltage generator RV includes a current source 222 and a resistor R2. The current source 222 is coupled to the resistor R2 and the comparator COM for generating a reference current IREF and outputting the reference voltage VREF. The reference voltage VREF may be associated with a difference between the second voltage VGL and the voltage drop of the resistor R2 caused by the reference current IREF. The comparator COM is configured to compare the target sensing voltage VSEN with the reference voltage VREF to generate a comparison result OCP indicating an overcurrent situation of the channel circuits 20_1 to 20_*n*. For example, when the target sensing voltage VSEN is greater than the reference voltage VREF, the comparator COM generates a comparison result OCP indicating that an overcurrent event occurs in the channel output signals CKO[1] to CKO[n] of the channel circuits 20_1 to 20_*n*.

Figure 6:
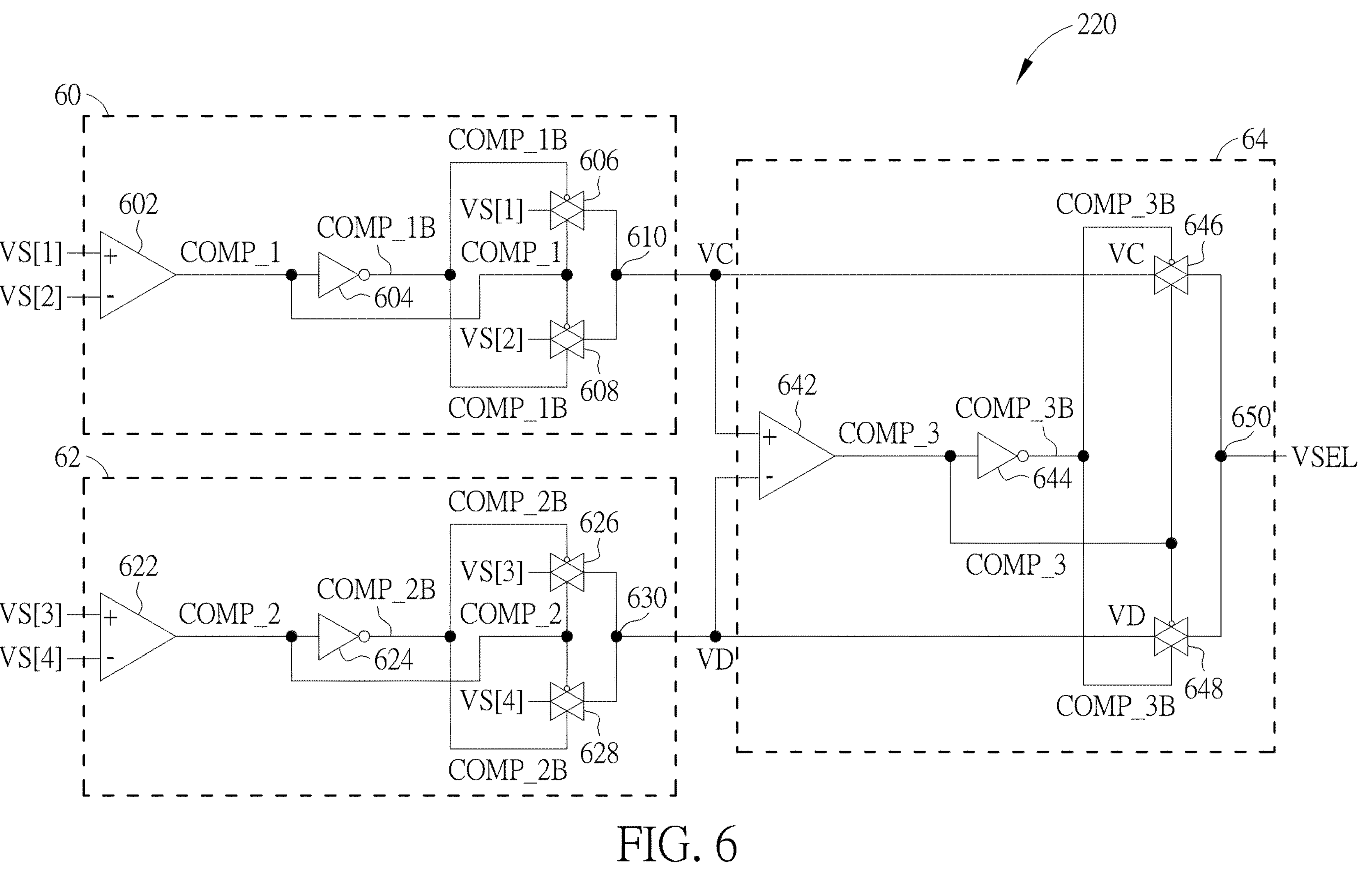
FIG. 6 is a schematic diagram of a selection circuit shown in FIG. 5 according to an embodiment of the present invention.

Taking the multi-channel circuit 2 with channel circuits 20_1 to 20_4 (4-channel) for example, the channel circuits 20_1 to 20_4 output the sensing signals VS[1] to VS[4], respectively. The selection circuit 220 is configured to receive the sensing signals VS[1] to VS [4] and select a sensing signal having the maximum voltage from the sensing signals VS[1] to VS[4] for acting as the target sensing signal VSEL. Please refer to FIG. 6, which is a schematic diagram of a selection circuit 220 shown in FIG. 5 according to an embodiment of the present invention. As shown in FIG. 6, the selection circuit 220 includes first stage voltage selectors 60 and 62, a second stage voltage selector 64. Each of the first stage voltage selectors 60 and 62 is configured to compare each pair of the received sensing signals and accordingly generate a selected sensing signal. The second stage voltage selector 64 is configured to select the target sensing signal VSEL from the selected sensing signals outputted by the first stage voltage selectors 60 and 62.

For example, the first stage voltage selector 60 compares the sensing signals VS[1] and VS[2] and selects one from the sensing signals VS [1] and VS [2] that has the higher voltage level for acting as a selected sensing signal VC of the first stage voltage selector 60. As shown in FIG. 6, the first stage voltage selector 60 includes a comparator 602, an inverter 604 and transmission gates 606 and 608. The comparator 602 is configured to compare the sensing signal VS [1] with the sensing signal VS[2] to generate a comparison signal COMP_1. The inverter 604 is to perform an inversion operation on the comparison signal COMP_1 to generate an inverted comparison signal COMP_1B. The inverted comparison signal COMP_1B is an inversion of the comparison signal COMP_1. An output terminal of the transmission gate 606 is configured to selectively output the sensing signal VS[1] according to the comparison signal COMP_1 and the inverted comparison signal COMP_1B. An output terminal of the transmission gate 608 is configured to selectively output the sensing signal VS[2] according to the comparison signal COMP_1 and the inverted comparison signal COMP_1B. A selection output terminal 610 of the first stage voltage selector 60 is coupled to the output terminals of the transmission gates 606 and 608, and is configured to output either the sensing signal VS [1] or the sensing signal VS [2] as a selected sensing signal VC of the first stage voltage selector 60. As such, the first stage voltage selector 60 selects one from the sensing signals VS[1] and VS[2] that has the higher voltage level for acting as the selected sensing signal VC of the first stage voltage selector 60.

The first stage voltage selector 62 includes a comparator 622, an inverter 624 and transmission gates 626 and 628. The second stage voltage selector 64 includes a comparator 642, an inverter 644 and transmission gates 646 and 648. The interconnections of the first stage voltage selector 62 and the second stage voltage selector 64 are as shown in FIG. 6, and the first stage voltage selector 62 and the second stage voltage selector 64 have similar operations and functions as the first stage voltage selectors 60. The first stage voltage selector 62 compares the sensing signals VS[3] and VS[4], and selects one from the sensing signals VS[3] and VS[4] that has the higher voltage level for acting as a selected sensing signal VD of the first stage voltage selector 62. The second stage voltage selector 64 compares the selected sensing signals VC and VD, and selects one from the selected sensing signals VC and VC that has the higher voltage level for acting as a target sensing signal VSEL. As result, the selection circuit 220 select a sensing signal having the maximum voltage from the sensing signals VS[1] to VS[4] for acting as the target sensing signal VSEL while the selection circuit 220 is coupled to the channel circuits 20_1 to 20_4 including pull-down circuits.

In an embodiment, the relationship of the sensing signals VS[1] to VS[4] of the channel circuits 20_1 to 20_4 may be represented as follows: VS[1]>VS[2]>VS[3]>VS[4]. Please further refer to FIG. 5 and FIG. 6. During operation, the selection circuit 220 receives the sensing signals VS[1] to VS[4] from the channel circuits 201 to 20_4. The comparison signals COMP_1 and COMP_2 are high, and the inverted comparison signals COMP_1B and COMP_2B are low. The sensing signal VS [1] is outputted to the selection output terminal 610 via the output terminal of the transmission gate 608 for acting as the selected sensing signal VC. The selected sensing signal VC outputted by the first stage voltage selector 60 is the sensing signal VS[1], i.e., (VC=VS [1]). The sensing signal VS[3] is outputted to the selection output terminal 630 via the output terminal of the transmission gate 628 for acting as the selected sensing signal VD. The selected sensing signal VD outputted by the first stage voltage selector 62 is the sensing signal VS[3], i.e., (VD=VS [3]). Further, the second stage voltage selector 64 receives the selected sensing signals VC and VD, i.e., VC=VS[1], VD=VS[3]. The comparison signal COMP_3 is high, and the inverted comparison signal COMP_3B is low. The selected sensing signal VC (i.e., sensing signal VS[1]) is outputted to the selection output terminal 650 via the output terminal of the transmission gate 648 for acting as the target sensing signal VSEL. The sensing signal VA[1] is selected as the sensing signal having the maximum voltage value among the sensing signals VS[1] to VS[4]. The target sensing signal VSEL outputted by the selection circuit 220 is the selected sensing signal VC, i.e., (VSEL=VC=VS[1]). Therefore, the target sensing signal VSEL is provided to the current sensing circuit CS for the following operations. Therefore, the target sensing signal VSEL is provided to the current sensing circuit CS for the following operations. The target sensing signal VSEL is converted to the target sensing voltage VSEN. The comparator COM compares the target sensing voltage VSEN with the reference voltage VREF to generate a comparison result OCP. For example, when the target sensing voltage VSEN is greater than the reference voltage VREF, the comparator COM generate a comparison result OCP indicating that an overcurrent event occurs in the channel output signals CKO[1] to CKO[4] of the channel circuits 20_1 to 20_4.

In another embodiment, the power switches MP[1] to MP[n] may be pull-down circuits. The selection circuit 220 is configured to select a plurality of sensing signals with a first number of highest voltage values from the sensing signals VS[1] to VS[n] as the target sensing signal VSEL. The selection circuit 220 may select sensing signals having the first number of highest voltage magnitudes or amplitude levels from the sensing signals VS [1] to VS [n] as the target sensing signals VSEL and output the target sensing signals VSEL to the current sensing circuit CS. The target sensing signals VSEL are converted to target sensing voltages VSEN. The comparator COM compares each of the target sensing voltages VSEN with the reference voltage VREF to generate comparison results OCP. For example, when at least one of the target sensing voltages VSEN is greater than the reference voltage VREF, the comparator COM generate a comparison result OCP indicating that an overcurrent event occurs in the channel output signals CKO[1] to CKO[n] of the channel circuits 20_1 to 20_*n*. For example, the selection circuit 220 may select sensing signals having the top three highest voltage values from the sensing signals VS[1] to VS[n] for acting as the target sensing signals VSEL. The selected target sensing signal VSEL having the top three highest voltage values may be converted to target sensing voltages VSEN. When at least one of the target sensing voltages is greater than the reference voltage VREF VSEN, the comparator COM generate a comparison result OCP indicating that an occurrence of overcurrent event.

In summary, the embodiments of the present invention provide a multi-channel circuit with overcurrent protection in order to prevent the circuits or electronic components from being damaged by the excessive output current. More particularly, the channel circuits 20_1 to 20_*n* of the embodiments of the present invention share a single common overcurrent protection circuit 22. Compared with the conventional multi-channel circuit 1 shown in FIG. 1, the multi-channel circuit 2 of the embodiments merely utilizes one overcurrent protection circuit including the selection circuit, the current sensing circuit. Therefore, the layout area required by the multichannel circuit 2 may be significantly reduced and the channel-to-channel mismatch may be effectively improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-channel circuit, comprising:

a plurality of channel circuits, configured to output a plurality of sensing signals associated with a plurality of channel output signals, wherein each channel circuit comprises a channel output circuit for outputting a channel output signal and one of the plurality of sensing signals is associated with the channel output signal of the channel output circuit of the each channel circuit, wherein each of plurality of channel circuits comprise a power switch and all power switches of pluralit of channel circuits are pull-up circuits or pull-down circuit; and an overcurrent protection circuit, comprising:

a selection circuit, coupled to the plurality of channel circuits, and configured to receive the plurality of sensing signals associated with the plurality of channel output signals and select a sensing signal having a first specified voltage value, which is the minimum voltage value when the power switches of plurality of channel circuits are pull-up circuits or is the maximum voltage value when the power switches of plurality of channel circuits are pull-down circuits, from the plurality of sensing signals associated with the plurality of channel output signals acting as a target sensing signal, comprising:

a plurality of first stage voltage selectors for comparing each pair of the plurality of sensing signals and accordingly generating a plurality of first selected sensing signals, such that the selection circuit selects the target sensing signal from the plurality of first selected sensing signals, wherein the plurality of sensing signals comprises a first sensing signal and a second sensing signal, one of the plurality of first stage voltage selectors compares the first sensing signal with the second sensing signal and selects one from the first sensing signal and the second sensing signal that has a second specific voltage value, which is the lower voltage value when the power switches of plurality of channel circuits are pull-up circuits or is the higher voltage value when the power switches of plurality of channel circuits are pull-down circuits, for acting as a first selected sensing signal;

a current sensing circuit, coupled to the selection circuit and configured into convert the target sensing signal into a target sensing voltage; and a comparator, coupled to the current sensing circuit and configured to compare the target sensing voltage with a reference voltage to generate a comparison result indicating an overcurrent situation of the plurality of channel circuits.

2. The multi-channel circuit of claim 1, wherein each of the plurality of channel circuits comprises:

the channel output circuit, configured to output the channel output signal;

the power switch, comprising a control terminal for receiving an enable signal, a first terminal coupled to the channel output circuit for receiving the channel output signal, and a second terminal; and a transfer switch, comprising a control terminal for receiving the enable signal, a first terminal coupled to the channel output circuit for receiving the channel output signal, and a second terminal coupled to the selection circuit and configured to output the sensing signal associated with the channel output signal of the channel output circuit of the each channel circuit in response to the enable signal.

3. The multi-channel circuit of claim 1, wherein the selection circuit further comprises a plurality of second stage voltage selectors for comparing each pair of the plurality of first selected sensing signals and accordingly and generating a plurality of second selected sensing signals, such that the selection circuit selects the target sensing signal from the plurality of second selected sensing signals.

4. The multi-channel circuit of claim 1, wherein the comparator comprises a first input terminal coupled to the current sensing circuit for receiving the target sensing voltage, a second input terminal for receiving the reference voltage, and an output terminal, wherein when the power switches of plurality of channel circuits are pull-up circuits, the output terminal of the comparator is configured to output the determination result indicating an occurrence of overcurrent situation for the plurality of channel circuits based on determining that the reference voltage is greater than the target sensing voltage.

5. The multi-channel circuit of claim 1, wherein the channel output circuit of the each channel circuit is a level shifter.

6. The multi-channel circuit of claim 1, the overcurrent protection circuit further comprises:

a first resistor, comprising a first terminal coupled to the current sensing circuit and the comparator, and a second terminal coupled to a power supply terminal.

7. The multi-channel circuit of claim 1, the overcurrent protection circuit further comprises:

a reference voltage generator, comprising:

a current source, coupled to the comparator and configured to output a reference current generate the reference voltage; and a second resistor, comprising a first terminal coupled to the current source and the comparator for outputting the reference voltage, and a second terminal coupled to a power supply terminal.

8. The multi-channel circuit of claim 1, wherein the comparator comprises a first input terminal coupled to the current sensing circuit for receiving the target sensing voltage, a second input terminal for receiving the reference voltage, and an output terminal, wherein when the power switches of plurality of channel circuits are pull-down circuits, the output terminal of the comparator is configured to output the determination result indicating an occurrence of overcurrent situation for the plurality of channel circuits based on determining that the target sensing voltage is greater than the reference voltage.

* * * * *